US012686000B2

(12) United States Patent
Rimer et al.

(10) Patent No.: US 12,686,000 B2
(45) Date of Patent: Jul. 21, 2026

(54) SYNTHESIS OF ZEOLITES WITH INTERCONNECTED NANOSHEETS

(71) Applicant: University of Houston System, Houston, TX (US)

(72) Inventors: Jeffrey D. Rimer, Houston, TX (US); Rishabh Jain, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 480 days.

(21) Appl. No.: 18/277,261

(22) PCT Filed: Feb. 16, 2022

(86) PCT No.: PCT/US2022/016525
§ 371 (c)(1),
(2) Date: Aug. 15, 2023

(87) PCT Pub. No.: WO2022/177935
PCT Pub. Date: Aug. 25, 2022

(65) Prior Publication Data
US 2024/0173705 A1 May 30, 2024

Related U.S. Application Data

(60) Provisional application No. 63/150,376, filed on Feb. 17, 2021.

(51) Int. Cl.
*B01J 29/40* (2006.01)
*B01J 35/40* (2024.01)
*B01J 35/45* (2024.01)
*B01J 37/03* (2006.01)
*B01J 37/08* (2006.01)

(52) U.S. Cl.
CPC .............. *B01J 29/40* (2013.01); *B01J 35/40* (2024.01); *B01J 35/45* (2024.01); *B01J 37/031* (2013.01); *B01J 37/08* (2013.01)

(58) Field of Classification Search
None
See application file for complete search history.

(56) References Cited

PUBLICATIONS

Jain et al., Microporous and Mesoporous Materials, 300, 2020, 110174 (Year: 2020).*

* cited by examiner

*Primary Examiner* — Yun Qian
(74) *Attorney, Agent, or Firm* — Jackson Walker LLP

(57) ABSTRACT

Interconnected zeolite nanosheets with a structural motif resembling self-pillared pentasil zeolites are synthesized through the use of MEL or MFI-type zeolites as crystalline seeds. The use of MEL- or MFI-type zeolites as crystalline seeds induces the spontaneous formation of pillared zeolites, thus avoiding, for the first time, the use of any organic or branching template for the crystallization of these hierarchical structures.

4 Claims, 8 Drawing Sheets

FIG. 3(A)-(B)
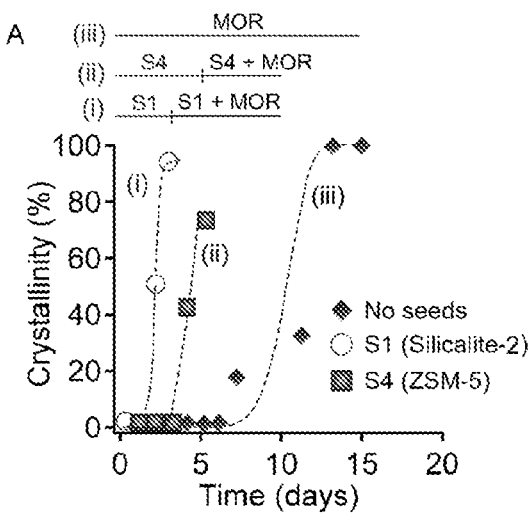
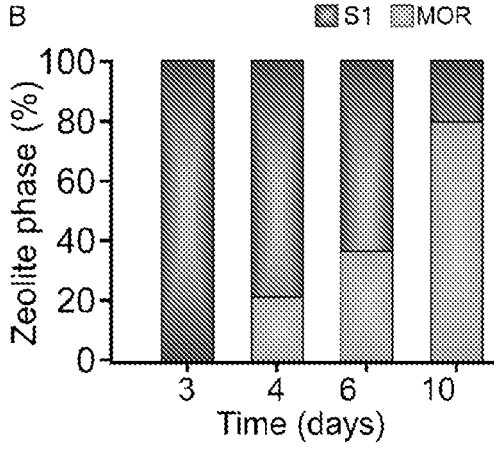

FIG. 4(A)-(C)
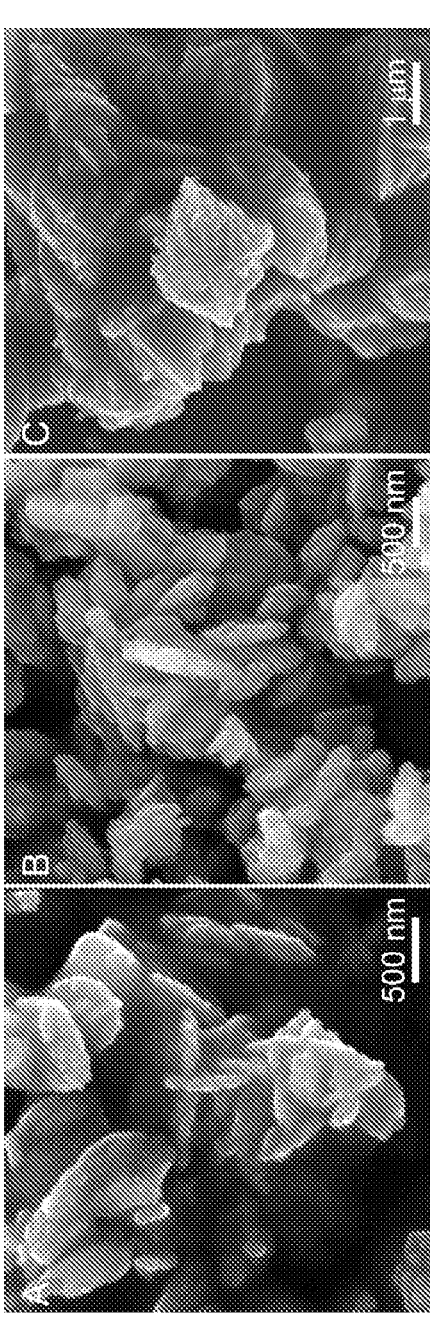
FIG. 5(A)
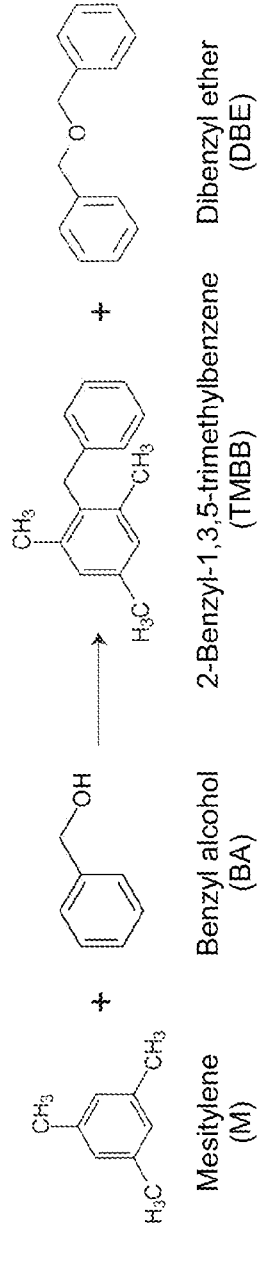

FIG. 5(B)-(E)
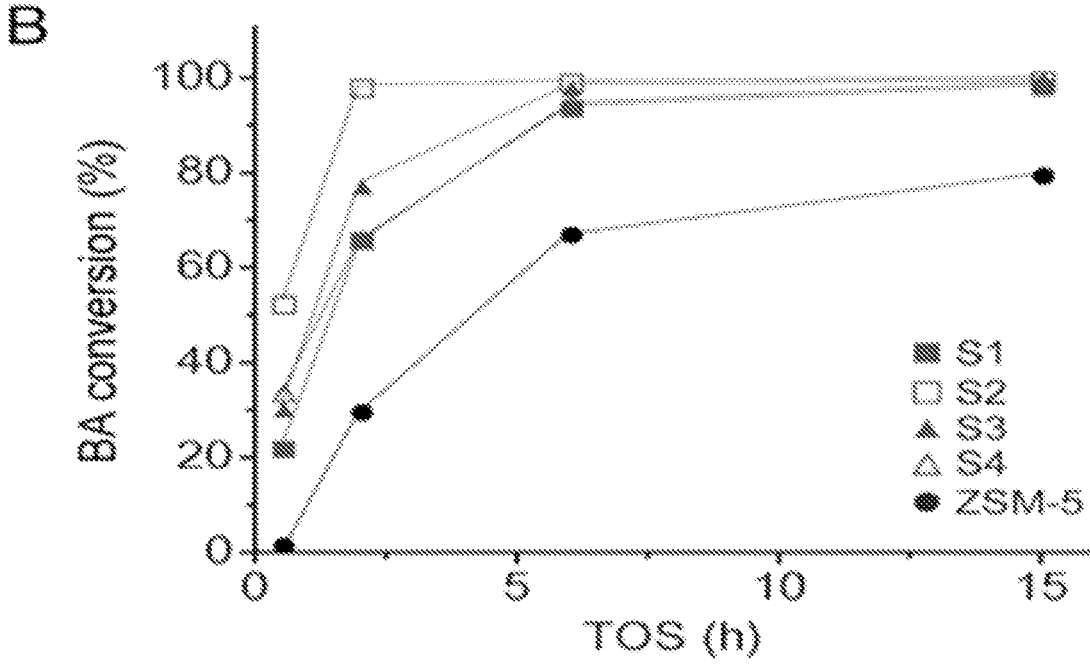
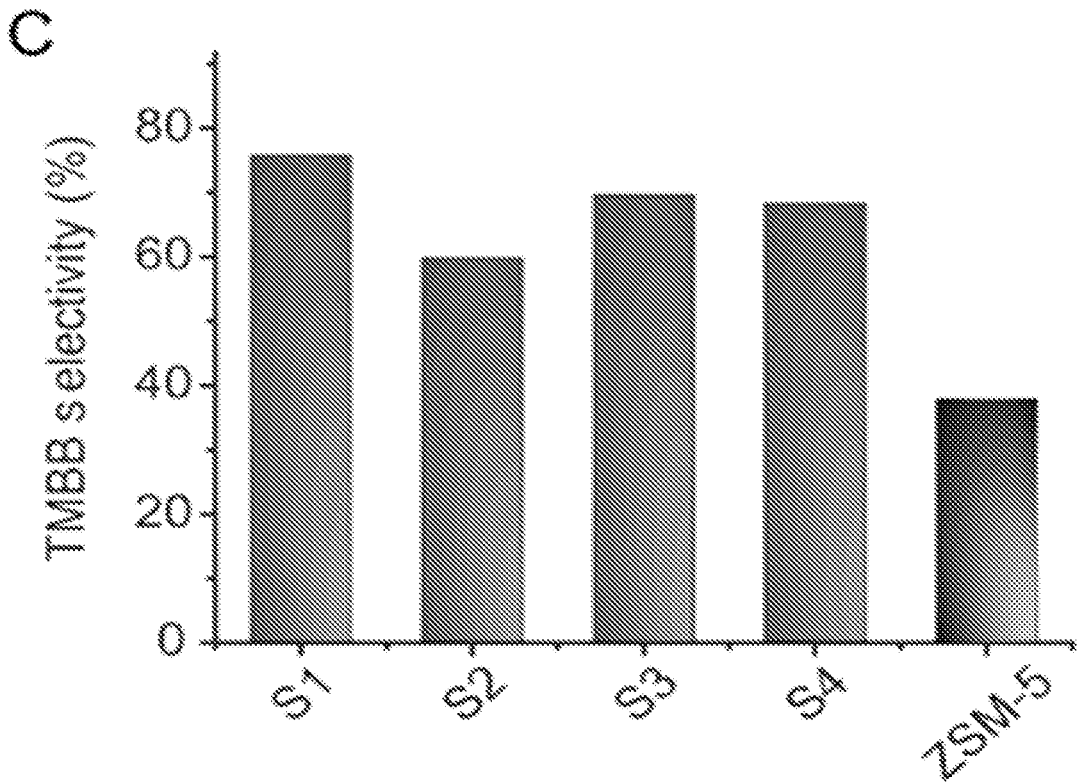

FIG. 5(B)-(E) cont'd
D
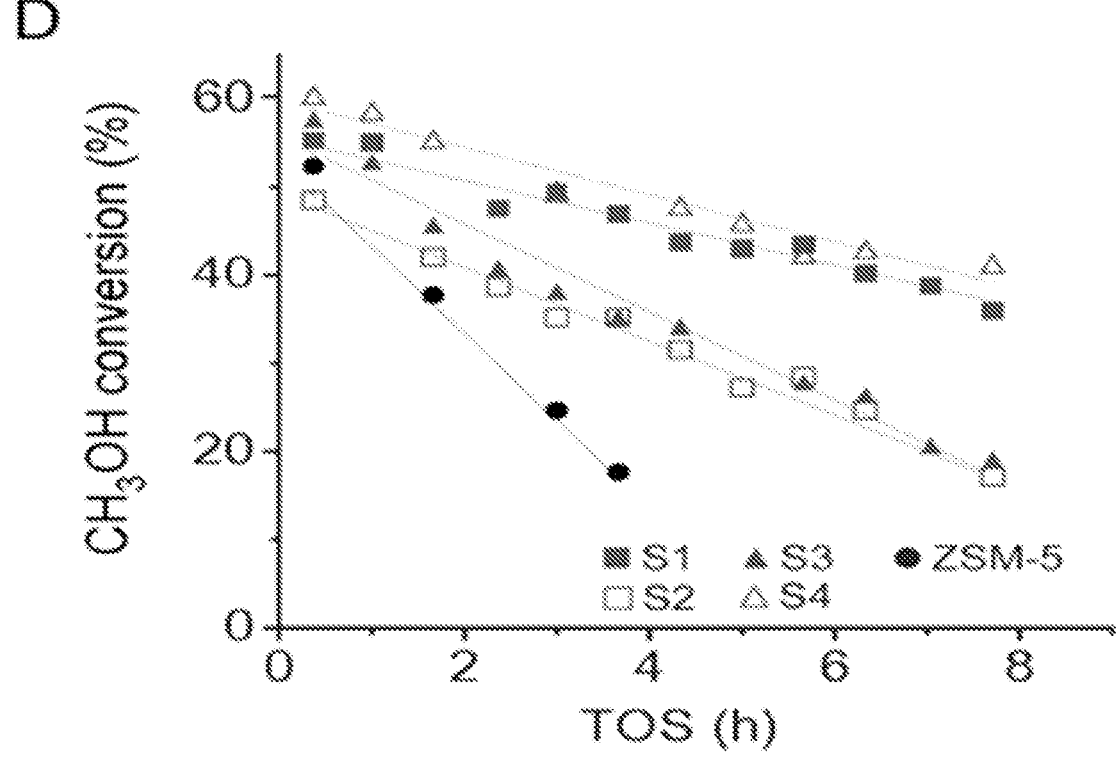
E
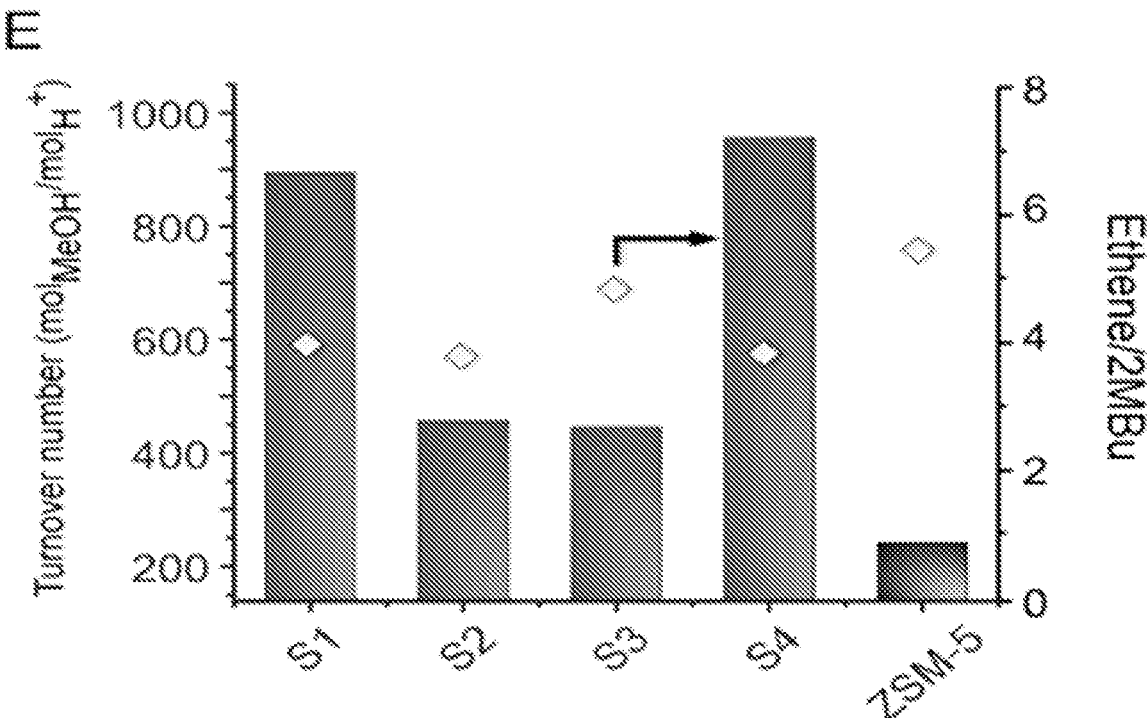

SYNTHESIS OF ZEOLITES WITH INTERCONNECTED NANOSHEETS

BACKGROUND

This application claims priority to U.S. Provisional Patent Application Ser. No. 63/150,376, entitled "Synthesis of Zeolites with Interconnected Nanosheets," filed Feb. 17, 2021, the entire contents of which are hereby incorporated by reference.

This invention was made with government support under grant DE-SC0014468 awarded by the Department of Energy, Basic Energy Sciences. The government has certain rights in the invention.

This disclosure pertains to synthesis of zeolites.

The network of micropores in zeolite catalysts imposes diffusion limitations that can compromise their performance in numerous applications. There have been many approaches used to improve mass transport in these porous aluminosilicates, which include the introduction of secondary pore structures (meso/macro) through post-synthesis desilication/dealumination or surfactant treatments, which generates hierarchical materials with a distribution of pores. It has been shown that hierarchical zeolites exhibit superior catalytic performance relative to conventional counterparts in various industrially-relevant chemical reactions, such as alkylation, Fischer-Tropsch synthesis, methanol/methane upgrading, cracking, and biomass conversion. Alternative approaches to reduce internal diffusion constraints include the synthesis of nanosized zeolites. Methods of preparing 2-dimensional (2D) MFI-type zeolites (uni- and multi-lamellar) with sizes on the order of several unit cells of the crystal structure have been introduced. A direct method of generating pillared nanosheets, referred to as self-pillared pentasil (SPP) zeolites, which improve mass transport by introducing meso/macropores with greater access to acid sites has also been introduced. While these hierarchical zeolites markedly improve catalyst performance, their syntheses have several limitations that can include a limited range of acid concentration (i.e. higher Si/Al ratios), low products yield, multiple synthesis steps, or the required use of an organic structure-directing agent (OSDA), all of which impose restrictions for commercialization.

Conventional methods to prepare hierarchical zeolites depend upon the use of organic structure-directing agents and often require multiple synthesis steps with limited product yield and Brønsted acid concentration.

SUMMARY

The present disclosure relates generally to synthesis of zeolites.

In particular, the present disclosure relates to synthesis of interconnected zeolite nanosheets with a structural motif resembling self-pillared pentasil zeolites through the use of MEL or MFI-type zeolites as crystalline seeds. The use of MEL- or MFI-type zeolites as crystalline seeds induces the spontaneous formation of pillared pentasil zeolites, thus avoiding, for the first time, the use of any organic or branching template for the crystallization of these hierarchical structures. The mechanism of formation was evaluated by time-resolved electron microscopy to provide unprecedented evidence for the heterogeneous nucleation and growth of sequentially-branched nanosheets from amorphous precursors. The resulting hierarchical zeolites have large external surface area and unusually high percentages of external acid sites, which markedly improves their catalytic performance in the Friedel craft alkylation and methanol to hydrocarbons reactions. These findings highlight a facile, commercially-viable synthesis method to reduce mass transport limitations and improve the performance of zeolite catalysts.

BRIEF DESCRIPTION OF THE DRAWINGS

FIG. 3 shows (A) percent crystallinity as a function of synthesis time measured from PXRD patterns, and (B) zeolite phase as a function of synthesis time FIG. 4 shows SEM images of (A) the S2 product after 3 days of heating, (B) the S3 product after 3 days of heating, and (C) the S4 product after 5 days of heating.

FIG. 5 shows (A) Friedel craft alkylation reaction of mesitylene (M) with benzyl alcohol (BA) used as a model liquid phase reaction to test self-pillared pentasil catalysts against ZSM-5, (B) benzyl alcohol conversion during Friedel craft alkylation reaction at 120° C. for zeolite interconnected nanosheet catalysts and conventional ZSM-5, (C) Selectivity of the alkylated product (TMBB) at isoconversion (ca. 75%), (D) Sub-complete methanol conversion in the methanol to hydrocarbon (MTH) reaction at 350° C. and weight hourly space velocities of 28, 28, 28, 21, and 33 $h^{-1}$ for S1, S2, S3, S4, and ZSM-5, respectively, and (E) Turnover number (histogram, left axis) estimated between 50 to 30% conversion and the ethene-to-2MBu ratio (symbols, right axis) of all catalysts at ca. 40% conversion.

DETAILED DESCRIPTION OF PREFERRED EMBODIMENTS

Figures 1A, 1B, 1C, 1D:
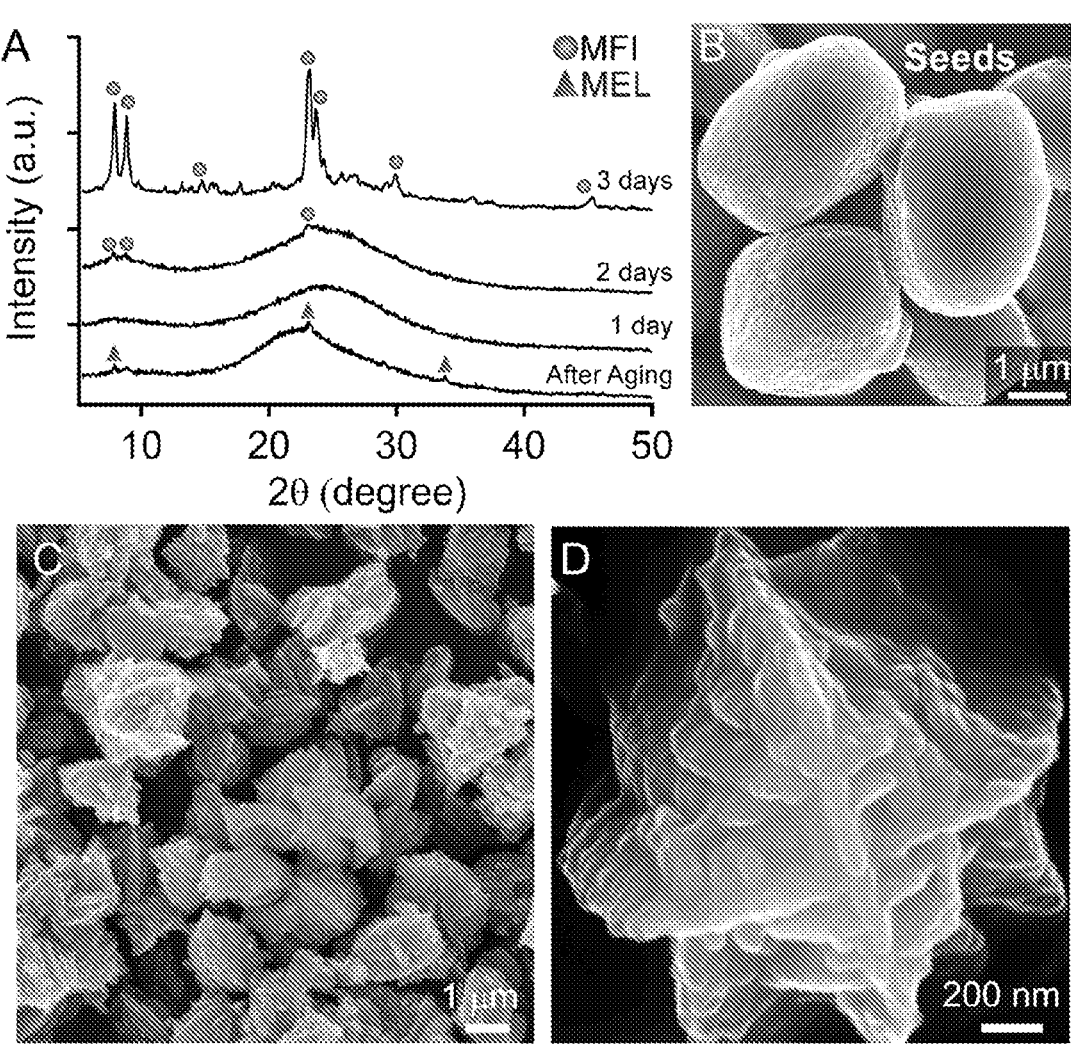
FIG. 1 shows (A) time-resolved PXRD patterns of solids extracted during synthesis of S1 (Table 1) using silicalite-2 (MEL) seeds, scanning electron micrographs of (B) silicalite-2 seeds and the (C) S1 product after 3 days of seeded growth, and (D) High magnification SEM image of a representative hierarchical S1 crystal with pentasil nanosheets.

The present disclosure relates to synthesis of zeolites, particularly to synthesis of zeolites with interconnected nanosheets.

Preferred embodiments described herein relate to an organic structure directing-agent (OSDA)-free, seed-assisted method of preparing interconnected nanosheets of pentasil zeolites. This appears to be the first direct synthesis of predominantly MFI-type pillared zeolite nanosheets without the use of organics. Seed-assisted synthesis of interconnected nanosheet zeolites has the added benefits of producing large product yields and high acid site concentrations that leads to enhanced catalytic performance in methanol to hydrocarbons (MTH) and Friedel-craft alkylation (FCA) reactions in comparison to conventional ZSM-5 catalysts.

In preferred embodiments, an organic-free medium (Si/Al=9) is used for crystallization with a composition that lies near the boundary of three zeolites: mordenite (MOR type), ZSM-11 (MEL type), and ZSM-5 (MFI type). Seed-assisted synthesis is carried out by adding calcined crystals (preferably 10% by mass) to this growth mixture. After 2 days of synthesis, Bragg peaks corresponding to pentasil zeolite (MEL or MFI type) can be detected in the PXRD pattern; and within 3 days crystallization is complete. Analysis of the final product reveals a predominantly MFI-type structure, although MEL-type zeolite may be present given the close similarity in PXRD patterns of the two zeolites. Preferred embodiments of the pentasil zeolite have a high Al content (i.e. Si/Al=8, nearly equivalent to the starting gel) with ca. 28% of all Brønsted acid sites located on external surfaces. Interestingly, scanning electron micrographs reveal a hierarchical morphology resembling self-pillared pentasil zeolites. High magnification images of preferred embodiments of the zeolite crystals show that pillared nanosheets are arranged in a "house of cards" configuration with an average thickness of ca. 30 nm and a distribution of both mesopores and macropores.

Previous syntheses of self-pillared pentasils and related 2-dimensional zeolites (e.g. multi-lamellar nanosheets) all required the use of OSDAs. The synthesis of the zeolite crystals described herein is the first OSDA-free, bottom-up route to achieve a hierarchical zeolite. The use of crystalline seeds is critical to achieving the pillared architecture. It has been demonstrated that interconnected nanosheets are mostly MFI-type zeolite, whereas the intersections (or junctions) between nanosheets may likely be MEL-type zeolite, which acts as a four-fold symmetric connector.

Preferred embodiments herein relate to a method for synthesizing zeolites with interconnected nanosheets. The method includes placing calcined zeolite seed crystals in an organic-free growth medium to form a growth solution, where the organic-free growth medium consists essentially of silica and aluminum in sodium hydroxide. The organic-free growth medium is free of any organic structure-directing agents and/or branching templates. Preferred embodiments of the organic-free growth medium also have a molar composition with the following ratio: A $Na_2O$:B $SiO_2$:C $Al_2O_3$:X $H_2O$, wherein A is 3.4 to 3.5, wherein B is 18 to 25, wherein C is 1 to 1.4, and wherein X is 220 to 600. In additional preferred embodiments, the organic-free growth medium has the above molar composition, where A is 3.42, B is 18, C is 1, and X is 224, 324, 424, or 600. In further preferred embodiments, the organic-free growth medium has the above molar composition, where A is 3.42, B is 24.62, C is 1.37, and X is 224, 324, or 443.

In preferred embodiments the calcined zeolite seed crystals are MEL or MFI type zeolite seed crystals. In additional preferred embodiments the calcined zeolite seed crystals are silicalite-2, ZSM-11, silicalite-1, or ZSM-5 crystals. The method further includes allowing the calcined zeolite seed crystals to form zeolite interconnected nanosheets in the growth solution. The growth solution may be heated and pressurized while allowing the zeolite interconnected nanosheets to form. The method further includes isolating the zeolite interconnected nanosheets from the growth solution. The hierarchical zeolites comprise interconnected nanosheets. Preferred embodiments of the zeolite interconnected nanosheets have a hierarchical, pillared morphology and a thickness of 30 nm.

Additional preferred embodiments include the zeolite interconnected nanosheets prepared by the methods described herein. Further preferred embodiments include a catalyst comprising the zeolite interconnected nanosheets prepared by the methods described herein. Additional preferred embodiments include a method for preparing or converting an organic compound comprising contacting the organic compound with a catalyst comprising the zeolite interconnected nanosheets prepared by the methods described herein. In additional preferred embodiments, the method for preparing or converting an organic compound may further comprise performing alkylation, Fischer-Tropsch synthesis, methanol or methane upgrading, cracking, or biomass conversion, in conjunction with the use of a catalyst comprising the zeolite interconnected nanosheets prepared by the methods described herein. Further preferred embodiments include the organic-free growth medium described herein.

Further aspects of the present invention will become apparent from the following description given by way of example only.

Example 1

Materials. The following chemicals for zeolite synthesis were purchased from Sigma Aldrich: monodispersed colloidal silica (LUDOX AS-40) (40 wt % suspension in water), tetraethyl orthosilicate (TEOS, ≥99.5%), sodium aluminate (57.1% $Al_2O_3$ and 37.2% $Na_2O$), 1,8-diaminooctane (DAO, 98%), and tetrapropylammonium bromide (TPABr, 98%). Additional chemicals purchased from Alfa Aesar included sodium hydroxide (98% pellets) and tetrabutylammonium hydroxide (TBAOH, 40%). All reagents were used as received without further purification. Deionized (DI) water used in all experiments was purified with an Aqua Solutions RODI-C-12A purification system (18.2 MΩ).

Methods

Synthesis of Seed Crystals. Seeds of MEL-type zeolite with Si/Al ratios of x (silicalite-2) and 33 (ZSM-11) and the MFI-type seeds with a Si/Al ratio of ∞ (silicalite-1) were synthesized according to previously reported protocols (R. Jain, J. D. Rimer, Seed-Assisted zeolite synthesis: The impact of seeding conditions and interzeolite transformations on crystal structure and morphology. *Microporous and Mesoporous Materials,* 110174 (2020)). ZSM-5 seeds with a Si/Al ratio of 40 were purchased from Zeolyst (CBV 8014). All seeds were calcined in a Thermo Fisher Lindberg Blue furnace at 550° C. for 10 h (with temperature ramp rate of 1° C. min$^{-1}$) under the constant flow of compressed air (Matheson, 100 cm$^3$ min$^{-1}$) before application.

Zeolite Interconnected Nanosheet Synthesis. Seed-assisted syntheses were carried out by first adding sodium aluminate to an aqueous NaOH solution followed by the addition of LUDOX AS-40 to obtain the growth solution with a molar composition of 3.42 $Na_2O$: 18 $SiO_2$: 1 $Al_2O_3$: 324 $H_2O$. The nominal amount of calcined seeds used in experiments was 10 wt %. The growth solution was aged at room temperature for ca. 24 h and subsequently transferred to a 23 mL acid digestion bomb (Parr Instruments). Hydrothermal treatment was carried out in an oven at 150° C. under autogenous pressure. Solids extracted after select time intervals were isolated from the mother liquor by two cycles of centrifugation and washing with DI water, followed by drying in an oven at 60° C. These samples were washed with 0.1 M HCl in 3 wt % suspension at room temperature for 5 h to remove any remnants of amorphous material. As-synthesized samples were converted to proton form by ion exchange wherein the calcined zeolite was mixed with a 1.0 M $NH_4NO_3$ solution to obtain a 2 wt % suspension. This mixture was heated to 80° C. for 2 h and the process repeated three times with centrifugation/washing between each ion exchange cycle. The final $NH_4$-zeolite samples were calcined once again with the same conditions stated above to generate H-form zeolites.

Synthesis of conventional ZSM-5 catalyst. Conventional ZSM-5 catalyst was prepared according to previously reported protocol (Y. Shen et al., Deconvoluting the competing effects of zeolite framework topology and diffusion path length on methanol to hydrocarbons reaction. *ACS Catalysis* 8, 11042-11053 (2018)). The as-synthesized sample was converted to proton form by ion exchange followed by calcination through the same protocols as above.

Four different batches of zeolites seeds (shown in Table 1 below) were prepared according to reported protocols: silicalite-2 (siliceous isostructure of ZSM-11), ZSM-11 (Si/Al=33), silicalite-1 (siliceous isostructure of ZSM-5), and ZSM-5 (Si/Al=40).

frequency of 12.5 kHz with a $\pi/12$ pulse width of 1.25 μs and a recycle delay of 0.8 s. The number of scans was 4096 for all measurements. The total amount of acid sites was determined by temperature-programmed desorption of ammonia ($NH_3$-TPD). Prior to TPD, ca. 50 mg of catalyst was first outgassed in Ar (Matheson, 30 $cm^3$ $min^{-1}$) for 4 h at 550° C. with a heating ramp of 2° C./min. Ammonia was adsorbed at 150° C. until saturated, followed by flushing with Ar for 120 min at 150° C. The ammonia desorption was monitored using the quadrupole mass spectrometer (Cirrus 3-XRd, MKS Instruments) until 700° ° C. with a ramp of 5° C./min. The fraction of acid site type (Brønsted vs. Lewis) and the fraction of acid sites present on external surfaces were estimated by FTIR spectroscopy with pyridine (Py) and 2,6-di-tert-butylpyridine (diTPy) as probe molecules, respectively. Infrared spectra were recorded with a Thermo Scientific Nicolet 6700 FTIR spectrometer at 2 $cm^{-1}$ optical resolution. Prior to FTIR measurements, the catalysts were pressed in self-supporting discs and were pre-treated in the sample cell at 450° C. for 2 h in $N_2$ (Matheson, 50 $cm^3$ $min^{-1}$). An excess of probe molecules was admitted by multiple pulse injections of 1.0 μl into the FTIR sample cell. Physisorbed molecules were subsequently removed by evacuation at the adsorption temperature. Difference spectra were obtained by subtracting the spectrum of the zeolite before probe molecule adsorption using the Thermo Scien-

TABLE 1

| Sample [a] | Seed | BET $S_A$ [b] (m²/g) | External $S_A$ [b] (m²/g) | $V_{micro}$ [b] (cm³/g) | Si/Al [c] | $C_{acid}$ [d] (μmol/g) | Acid Type (%) [e] B | Acid Type (%) [e] L | $B_{ext}$ [f] (%) | EFAl [g] (%) |
|---|---|---|---|---|---|---|---|---|---|---|
| S1 | Silicalite-2 | 499 | 135 | 0.14 | 8 | 914 | 80 | 20 | 27 | 12 |
| S2 | ZSM-11 | 492 | 133 | 0.14 | 8 | 877 | 89 | 11 | 30 | 14 |
| S3 | Silicalite-1 | 434 | 48 | 0.15 | 10 | 785 | 81 | 19 | 8 | 7 |
| S4 | ZSM-5 | 503 | 150 | 0.14 | 8 | 816 | 74 | 26 | 57 | 15 |
| ZSM-5 | — | 420 | 43 | 0.15 | 18 | 782 | 87 | 13 | 6 | 9 |

[a] S = sample of interconnected nanosheets; conventional ZSM-5 was synthesized by a reported protocol;
[b] BET surface area ($S_A$) was obtained from $N_2$ adsorption/desorption with external $S_A$ and microporous volume ($V_{micro}$) calculated by the t-plot method;
[c] Si/Al ratio measured by EDX;
[d] acid site density ($C_{acid}$) measured by $NH_3$ -TPD;
[e] acid type measured by pyridine FTIR where B = Brønsted acid sites and L = Lewis acid sites;
[f] $B_{ext}$ = fraction of acid sites on external surfaces obtained from $B_{diTPy}/B_{py}$;
[g] EFAl = extra-framework Al measured by $^{27}$Al MAS NMR.

Characterization. Powder X-ray diffraction (PXRD) patterns of dried solids were collected on a Rigaku SmartLab diffractometer with a Cu Kα source (40 kV, 30 mA). Scanning electron microscopy (SEM) images were obtained using a Zeiss Leo 1525 instrument equipped with FEG at 10 kV. All samples were carbon coated (layer thickness ~30 nm) prior to imaging to reduce charging. The size and morphology of the crystals was measured from multiple SEM images of a single batch. Elemental analysis was performed by electron dispersive X-ray (EDX) spectroscopy. EDX spectra were collected using a JEOL SM-31010/METEK EDAX system at 15 kV and a 15 mm working distance.

Textural analysis was performed with a Micromeritics 3 flex instrument using $N_2$ as a probe gas for physisorption. Surface area was calculated from the BET isotherm and micropore volume was estimated by the t-plot method. Pore size distribution was obtained from the adsorption isotherm using the BJH method. Solid-state $^{27}$Al NMR experiments were performed at 11.7 T on a JEOL ECA-500 spectrometer, equipped with a 3.2 mm field gradient magic angle spinning probe. The $^{27}$Al MAS NMR data were obtained at a spinning tific OMNIC series software. The amount of adsorbed probe molecule was determined by using the integrated area of a given band with the molar extinction coefficients provided in the literature.

Catalytic Measurements. Methanol-to-hydrocarbon (MTH) reaction was carried out in a ¼ inch stainless steel tube installed in a resistively heated furnace (Model 3210, Applied Test Systems). The catalyst bed was supported between two plugs of quartz wool. A K-type thermocouple (Omega Engineering) was inserted into the stainless tube to measure the temperature of the catalyst bed. Prior to the reaction, the catalyst bed was pretreated in situ at 550° ° C. for 3 h under the flow of dried air (6 $cm^3$ $min^{-1}$ of $O_2$, 24 $cm^3$ $min^{-1}$ of $N_2$). The catalyst bed was then cooled to the reaction temperature, 350° C. Methanol was fed by a syringe pump (Harvard Apparatus) at 7 μL $min^{-1}$ into a heated inert gas stream of Ar (Matheson, 30 $cm^3$ $min^{-1}$). Reaction effluent was evaluated using an on-stream gas chromatograph (Agilent 7890B) equipped with a flame ionization detector. To compare the deactivation rate of the catalysts, reactions were carried out at a sub complete methanol conversion, X, with the initial conversion regulated by adjusting the catalyst mass. Methanol conversion is defined as:

$$X = \left[1 - \frac{C_{eff}}{C_{feed}}\right] * 100\% \qquad (1)$$

where $C_{eff}$ is the carbon-based molar concentration of both methanol and dimethyl ether (DME) in the effluent and $C_{feed}$ is the concentration of methanol in the feed. The selectivity Si of hydrocarbon product i is defined as $$S_i = \left[\frac{C_i}{C_{t,eff}}\right] * 100\% \qquad (2)$$

where $C_i$ is the carbon-based molar concentration of hydrocarbon i in the effluent and $C_{t,eff}$ is the total carbon-based molar concentration of hydrocarbons in the effluent.

To compare the deactivation rate between different catalyst samples, the turnover number (TON) is calculated for a selected span of time-on-stream (TOS) using a modified form of a previously-reported equation:

$$TON(t) = \frac{1}{[H]_0^+} \int_{t_1}^{t_2} F(\tau)d\tau \qquad (3)$$

where $[H^+]_0$ is the total number of Brønsted acid sites, $F(\tau)$ is the molar flow rate of converted carbon (reacted methanol), and t is the TOS selected between times $t_1$ and $t_2$ corresponding to 50 and 30% methanol conversion, respectively.

The Friedel-Crafts alkylation reaction of mesitylene with benzyl alcohol was carried out in a septum-sealed, round-bottom flask (100 ml) with magnetic stirring. A fixed quantity of the catalyst (100 mg) was added to 190 mmol of mesitylene and the mixture heated at 120° C. for 15 min in an oil bath. After that, 2 mmol benzyl alcohol (BA) was injected into the mixture by using an elongated steel needle and this moment was labelled as initial reaction time. The samples were withdrawn at different time intervals and were filtered with 0.2 μm filter. The filtered liquid samples were analyzed using a gas chromatograph (Agilent 7890B) equipped with a flame ionization detector. Since mesitylene is present in excess, benzyl alcohol was considered as the main reactant, with the conversion ($X_{BA}$) and selectivity of alkylated product ($S_{TMBB}$) defined as $$X_{BA} = \frac{N_{BA,0} - N_{BA}}{N_{BA,0}} = \frac{N_{TMBB} + N_{DBE}}{N_{TMBB} + N_{BA} + N_{DBE}} \qquad (4)$$

$$S_{TMBB} = \left[\frac{N_{TMBB}}{N_{TMBB} + N_{DBE}}\right] * 100\% \qquad (5)$$

where $N_{BA,0}$ is the mole amount of benzyl alcohol in the feed and $N_{BA}$, $N_{TMBB}$, and $N_{DBE}$ are the mole amounts of benzyl alcohol, alkylated product 2-benzyl-1,3,5-trimethylbenzene (TMBB), and ether product dibenzyl ether (DBE) in the reaction mixture.

Results:

FIG. 1 shows (A) time-resolved PXRD patterns of solids extracted during the synthesis of S1 (from Table 1) using silicalite-2 (MEL) seeds, scanning electron micrographs of (B) silicalite-2 seeds and the (C) S1 product after 3 days of seeded growth, and (D) High magnification SEM image of a representative hierarchical S1 crystal with pentasil nanosheets of thickness 30 to 50 nm and mesopores comprising the space between intersecting nanosheets.

Focusing initially on seed-assisted syntheses using silicalite-2, powder X-ray diffraction (PXRD) patterns of solids extracted from syntheses at periodic times (FIG. 1(A)) revealed that MEL-type seeds dissolved within 1 day of hydrothermal treatment. Given that the sample was predominantly comprised of amorphous aluminosilicate precursors, it was difficult to ascertain if silicalite-2 seed crystals (FIG. 1(B)) fully or partially dissolved.

Zeolite syntheses typically involve long induction periods followed by rapid crystallization that makes it challenging to visualize the early stages of nucleation. It has long been postulated that numerous zeolites, including ZSM-5, are formed via heterogeneous nucleation on (or within) amorphous precursors, although direct evidence is generally lacking.

Figures 2A, 2B, 2C, 2D:
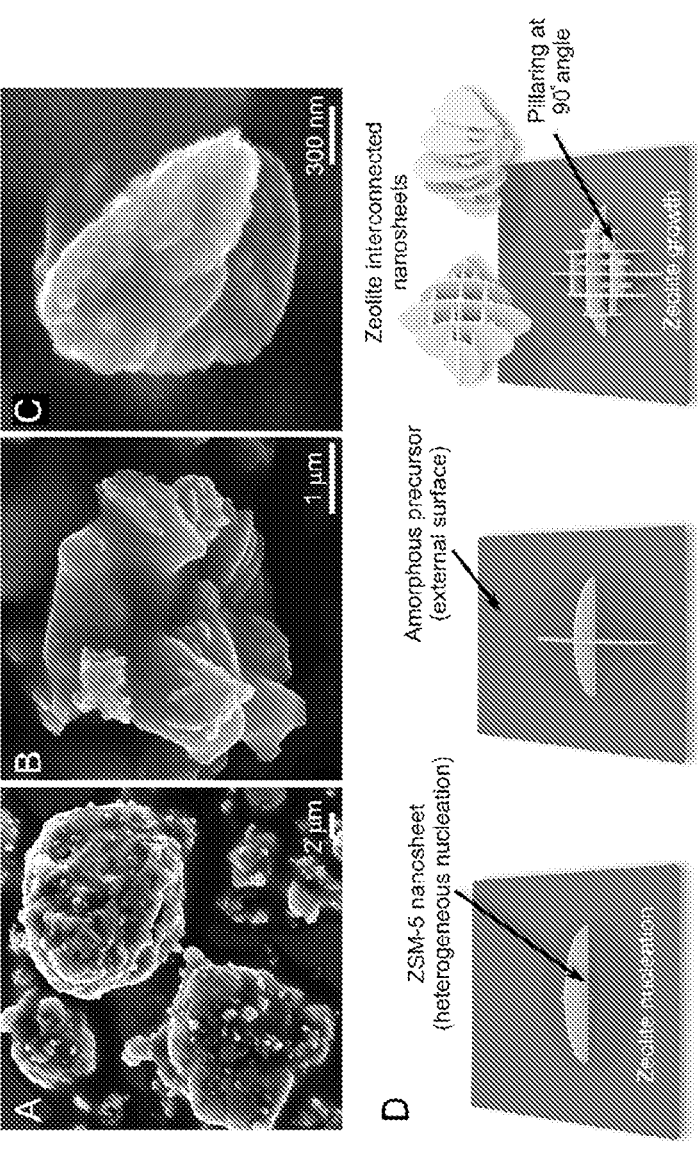
FIG. 2 shows SEM images of solids extracted from S1 synthesis (Table 1) at (A) 1 day and (B and C) 2 days, and (D) an idealized schematic of heterogeneous nucleation and growth of zeolite interconnected nanosheets on amorphous interfaces in the absence of organics.

FIG. 2 shows SEM images of solids extracted from a SI synthesis (Table 1) at the following times: (A) 1, (B) 2, and (C) 3 days, showing a representative zeolite interconnected nanosheet with spheroidal protrusions characteristic of nonclassical crystallization, (D) and (E) higher magnification images of solids extracted after 2 days of heating capturing the heterogeneous nucleation and pillaring of hierarchical pentasil zeolite crystals emerging from the surfaces of amorphous precursors, and (F) an idealized schematic of heterogeneous nucleation and growth of zeolite interconnected nanosheets on amorphous interfaces in the absence of organics. Prior studies have proposed that pillaring can be promoted by the presence of MEL-type nanosheet intersections that connect four MFI-type nanosheets.

One unique aspect of SI synthesis is a relatively slow rate of growth following nucleation that enables the direct visualization of crystallization at various stages. Solids extracted from growth mixtures at early times contain mostly amorphous particles; however, the emergence of crystallites on the surfaces of amorphous precursors is observed after 1 day of heating (FIG. 2(A)). Solids extracted after longer times (FIGS. 2(B) and 2(C)) contain a population of interconnected nanosheet crystals on precursor surfaces. SEM images reveal spheroidal protrusions on the surfaces of nanosheets, which are signatures of a nonclassical growth pathway. Previous studies have shown that MFI-type zeolite grows by a combination of monomer addition (classical pathway) and amorphous particle attachment followed by disorder-to-order transitions that initiate 3-dimensional nucleation of new layers on zeolite surfaces. Here, heterogeneous nucleation of interconnected nanosheet crystals is directly visualized with unprecedented resolution wherein pillars emerge from amorphous particles (FIG. 2(A) to FIG. 2(C)) and branch into the larger hierarchical network of intersecting nanosheets (illustrated in FIG. 2(D)). These observation defy conventional beliefs that organics are necessary in zeolite crystallization to generate nanosheets and/or facilitate pillaring.

The exact mechanism of pillaring in the absence of an organic structure-directing agent (OSDA) is unknown, but it is speculated that growth mixtures prior to the onset of nucleation contain some "memory" of the dissolved silicalite-2 seeds. In the absence of seeds, the growth mixture selected for this study produces mordenite crystals lacking hierarchical structure.

FIG. 3 shows (A) Percent crystallinity as a function of synthesis time measured from PXRD patterns. The addition of MEL (open circles) or MFI (closed squares) seeds during the synthesis of S1 and S4, respectively, reduces the time of crystallization compared to the non-seeded control synthesis (closed diamonds). FIG. 3 also shows that (B) extending the synthesis time of S1 (>3 days) leads to nucleation and growth of mordenite (MOR) via an interzeolite pentasil-to-MOR transformation.

FIG. 4 shows (A) a SEM image of solids extracted from the S2 synthesis using ZSM-11 seeds after 3 days, (B) SEM image of solids extracted from the S3 synthesis using silicalite-1 seeds after 3 days, and (C) SEM image of solids extracted from the S4 synthesis using ZSM-5 seeds after 5 days of heating.

Interestingly, time-resolved studies of seeded growth reveal that S1 is fully crystalline after 3 days of heating (FIG. 3(A)), which is approximately one-fourth the time required for non-seeded growth mixtures. Additional synthesis time results in an interzeolite transformation from SI to mordenite (FIG. 3(B)) where the latter nucleates within the interior of S1 clusters and gradually consumes hierarchical zeolites with prolonged heating. The pillared architecture could be attributed to the remnants of seeds with a MEL-type structure that facilitates branching (i.e. nanosheet junctions, FIG. 2(D)). To test this point, a similar synthesis was performed using three different seeds: ZSM-11 (MEL), silicalite-1 (MFI), and ZSM-5 (MFI). All syntheses resulted in zeolite interconnected nanosheets (Table 1), referred to as samples S2, S3, and S4, respectively. The kinetics of S2 and S3 crystallization were similar to S1 (FIG. 3(A)), but S4 deviated from the others by reaching a maximum 80% crystallinity (FIG. 3(A)) with residual ca. 20% amorphous material prior to the onset of the interzeolite transformation. Time-resolved SEM images of S2 (FIG. 3(A)), S3 (FIG. 3(B)), and S4 (FIG. 3(C)) samples at various stages of growth reveal similar mechanisms of heterogeneous nucleation from amorphous precursors. All zeolite interconnected nanosheet materials have similar hierarchical structure with varying degrees of branching, while the morphology of S3 (FIG. 3B) derived from silicalite-1 seeds exhibits a higher degree of aggregation. This indicates that branching occurs irrespective of seed crystal structure. The use of MEL-type seeds results in higher surface area (Table 1), but its average nanosheet thickness (ca. 40 nm) is comparable to other zeolite interconnected nanosheet materials (with the exception of S3, which is around 60 nm). All materials prepared by seeded growth (with the exception of S3) exhibit unusually high fractions of Brønsted acid sites on their exterior surfaces (Table 1), as high as 7-fold the value of conventional ZSM-5.

The catalytic performance of all zeolite interconnected nanosheet samples with an overall particle size of 1.1-2.3 μm was tested and the results compared to that of a conventional ZSM-5 catalyst with an overall crystal size of 300 nm. All zeolite interconnected nanosheet samples were subjected to mild acid pre-treatment to remove any residual amorphous material, followed by ion exchange with $NH_4^+$ and calcination to generate H-form catalysts. Elemental analysis of zeolite interconnected nanosheets and ZSM-5 samples revealed similar acid concentration and distributions of Brønsted and Lewis acids (Table 1).

FIG. 5 shows (A) Friedel craft alkylation reaction of mesitylene (M) with benzyl alcohol (BA) used as a model liquid phase reaction to test self-pillared pentasil catalysts against ZSM-5, (B) Benzyl alcohol conversion during Friedel craft alkylation reaction at 120° C. for zeolite interconnected nanosheet catalysts and conventional ZSM-5, where lines are interpolations to guide the eye, (C) Selectivity of the alkylated product (TMBB) at isoconversion (ca. 75%), (D) Sub-complete methanol conversion in the MTH reaction at 350° C. and weight hourly space velocities of 28, 28, 28, 21, and 33 $h^{-1}$ for S1, S2, S3, S4, and ZSM-5, respectively, where the zeolite interconnected nanosheet catalysts exhibited higher stability compared to conventional ZSM-5 and lines are linear regression, and (e) turnover number (histogram, left axis) estimated between 50 to 30% conversion and the ethene-to-2MBu ratio (symbols, right axis) of all catalysts at ca. 40% conversion.

The impact of two key features of zeolite interconnected nanosheet catalysts—large external acid site concentration and high surface area—were first tested using the Friedel craft alkylation reaction of mesitylene with benzyl alcohol (FIG. 5(A)). This liquid-phase reaction predominantly occurs on exterior surfaces of the zeolite owing to the bulky size of mesitylene that cannot readily access interior channels of medium-pore zeolites (i.e. MFI and MEL types). Comparison of all five catalysts revealed a significantly higher activity of zeolite interconnected nanosheet materials compared to ZSM-5 (FIG. 5(B)) with S2 exhibiting the most rapid increase in benzyl alcohol conversion. Interestingly, the selectivity of zeolite interconnected nanosheet catalysts for the desirable product, 2-benzyl-1,3,5-trimethylbenzene (TMBB), was ca. 2-fold higher than ZSM-5 (FIG. 5(C)). This exceptional performance is attributed to the unique physicochemical properties of the hierarchical zeolites; however, a signature of zeolite interconnected nanosheets prepared by seed-assisted synthesis is their unusually high aluminum content (Si/Al<15, Table 1). Self-pillared pentasils and other hierarchical MFI-type zeolites reported in literature have not been directly synthesized with Si/Al ratios less than 30, which is outside the range of most commercial ZSM-5 zeolites (i.e. Si/Al<20).

Methanol-to-hydrocarbons (MTH) was used as a second reaction to assess the performance of hierarchical and conventional catalysts. Gas-phase reactions at sub-complete conversion (50-60%) revealed that all zeolite interconnected nanosheet catalysts exhibited improved lifetime compared to conventional ZSM-5 (FIG. 5(D)). The performance of zeolite interconnected nanosheet catalysts can be grouped in two general categories: those with around 2-fold lower rates of deactivation (S2 and S3) and those with around 4-fold lower rates of deactivation (S1 and S4) compared to ZSM-5. These groupings also apply to the measured turnover number (TON), or moles of methanol converted per mole of Brønsted acid (FIG. 5(E)). The two groupings of zeolite interconnected nanosheet catalysts have TON values of around 900 and 450 mol $MeOH/H^+$, respectively, which are significantly larger than that of conventional ZSM-5 (240 mol $MeOH/H^+$). All five catalysts exhibited similar product selectivity, which was evaluated using the ethene-to-2MBu ratio (FIG. 5(E), symbols) where 2MBu refers to both 2-methylbutane and 2-methyl-2-butene. This ratio is a signature of the dominant MTH cycle (olefin vs. aromatic) with lower numbers indicating an enhanced propagation of the olefin cycle. A slightly lower value of ethene/2MBu for zeolite interconnected nanosheet catalysts is qualitatively consistent with a previous study showing that ZSM-5 with reduced internal mass transport limitations (e.g. smaller crystal dimensions) promotes the olefin cycle. Overall, this study reveals that zeolite interconnected nanosheet zeolites prepared by seed-assisted synthesis exhibit exceptional catalytic performance. Moreover, a qualitative comparison of zeolite interconnected nanosheet catalysts with hierarchical ZSM-5 reported in literature containing less aluminum content and thinner nanosheets (ca. 3 nm) indicates comparable performance, although previous studies report MTH reactions at 100% methanol conversion, which overestimates catalyst lifetime.

In summary, zeolite interconnected nanosheets were prepared by the use of either MEL or MFI type zeolite seeds without the assistance of any organic structure-directing or branching agents. By time-resolved electron microscopy, heterogeneous nucleation was visualized and the subsequent emergence of these hierarchical zeolites from the surfaces of amorphous precursors was captured. From the onset of crystallization, the zeolite interconnected nanosheets present a clear pillared architecture that undergoes concerted growth and branching with reaction time. Although the exact mechanism of pillaring is unknown, remnants from the dissolved seeds likely imprint some "memory" in the growth mixtures that facilitate the branching. This phenomenon occurs for both MEL- and MFI-type seeds, resulting in similar hierarchical structures with varying degrees of branching. These zeolite interconnected nanosheet materials present a large external surface area (almost triple that of conventional ZSM-5) and an exceptionally high percentage of external acid sites (up to 7-fold higher than conventional ZSM-5). These two key features significantly improve catalytic performance. The evaluation of zeolite interconnected nanosheets in the Friedel craft alkylation reaction of mesitylene with benzyl alcohol shows higher conversion and an approximate two-fold increase in the selectivity to the desirable product. Similarly, the MTH reaction shows that zeolite interconnected nanosheets extend catalyst lifetime and markedly enhance turnovers (as much as 4-fold relative to conventional ZSM-5). These findings highlight the potential use of this facile, efficient method of seed-assisted synthesis towards the realization of commercial hierarchical zeolite catalysts.

Example 2

Interconnected nanosheet synthesis. Seed-assisted syntheses were carried out by first adding sodium aluminate to an aqueous NaOH solution followed by the addition of the silicon source LUDOX AS-40 to obtain a growth solution with molar compositions:

$$3.42 Na_2O:18SiO_2:1Al_2O_3:X\ H_2O(X=224,324,424, 600)$$

$$3.42 Na_2O:24.62SiO_2:1.37Al_2O_3:X\ H_2O(X=324,224, 443)$$

To each of these solutions, silicalite-2 seeds prepared as described above were added. The nominal amount of calcined seeds used in all experiments was 10 weight percent. The growth solution was aged at room temperature for approximately 24 h and subsequently transferred to an acid digestion bomb (Parr Instruments). Hydrothermal treatment was carried out in an oven at 150° C. under autogenous pressure. Solids extracted after select time intervals were isolated from the mother liquor by two cycles of centrifugation and washing with deionized water, followed by drying in an oven at 60° C.

Figure 6:
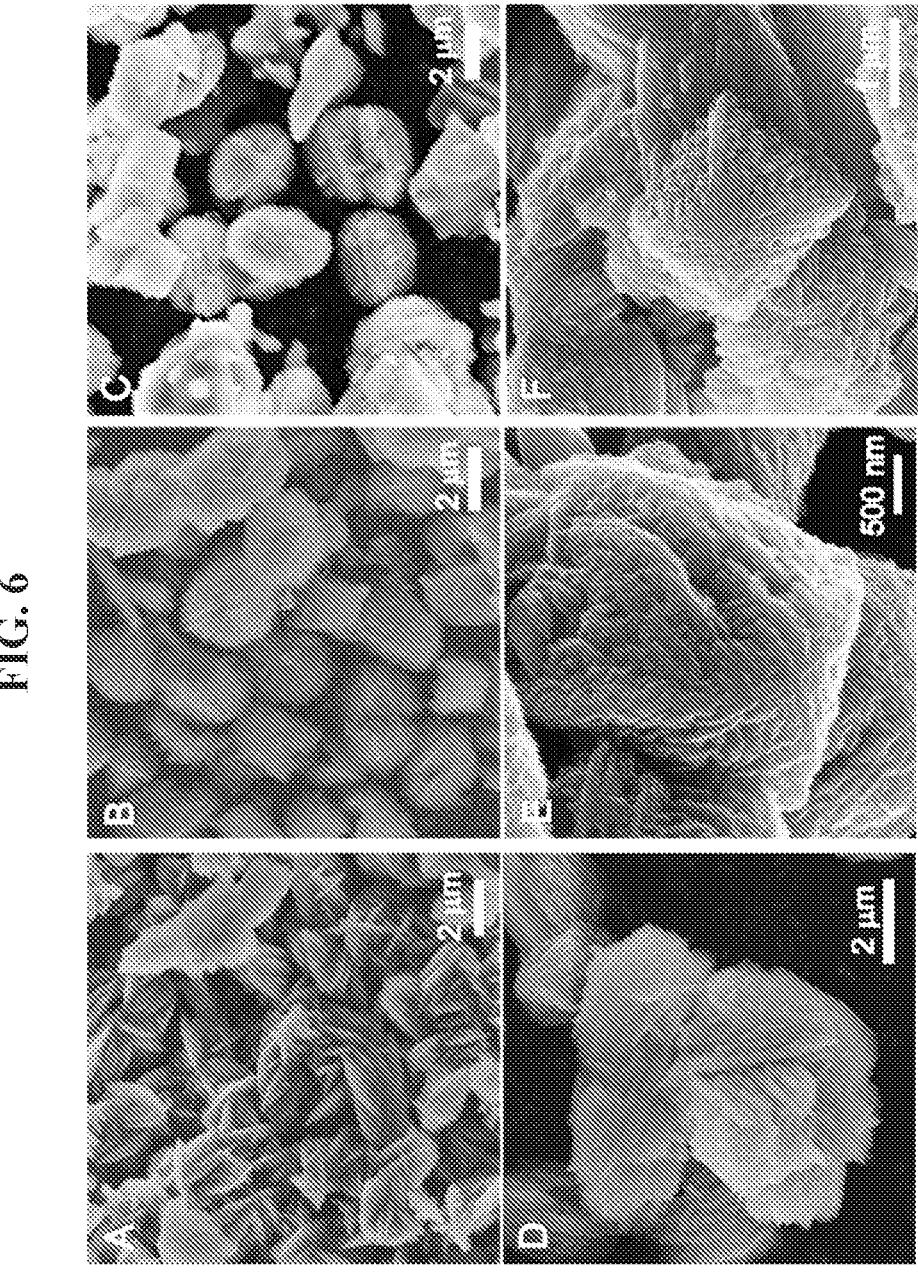
FIG. 6 shows SEM images for exemplary interconnected zeolite nanosheets extracted from syntheses using silicalite-2 seeds and organic-free growth media with molar compositions of (A-C) 3.42 $Na_2O$: 18 $SiO_2$: 1 $Al_2O_3$:X $H_2O$ and (D-F) 3.42 $Na_2O$: 24.62 $SiO_2$: 1.37 $Al_2O_3$:X $H_2O$, where: (A) X=224, (B) X=424, (C) X=600, (D) X=224, (E) X=324, and (F) X=443.

FIG. 6 shows SEM images for the interconnected zeolite nanosheets extracted from the different syntheses described above using silicalite-2 seeds and molar compositions (A-C) 3.42 $Na_2O$: 18 $SiO_2$: 1 $Al_2O_3$:X $H_2O$ and (D-F) 3.42 $Na_2O$: 24.62 $SiO_2$: 1.37 $Al_2O_3$:X $H_2O$, with different water contents: (A) X=224, (B) X=424, (C) X=600, (D) X=224, (E) X=324, and (F) X=443.

Figure 7:
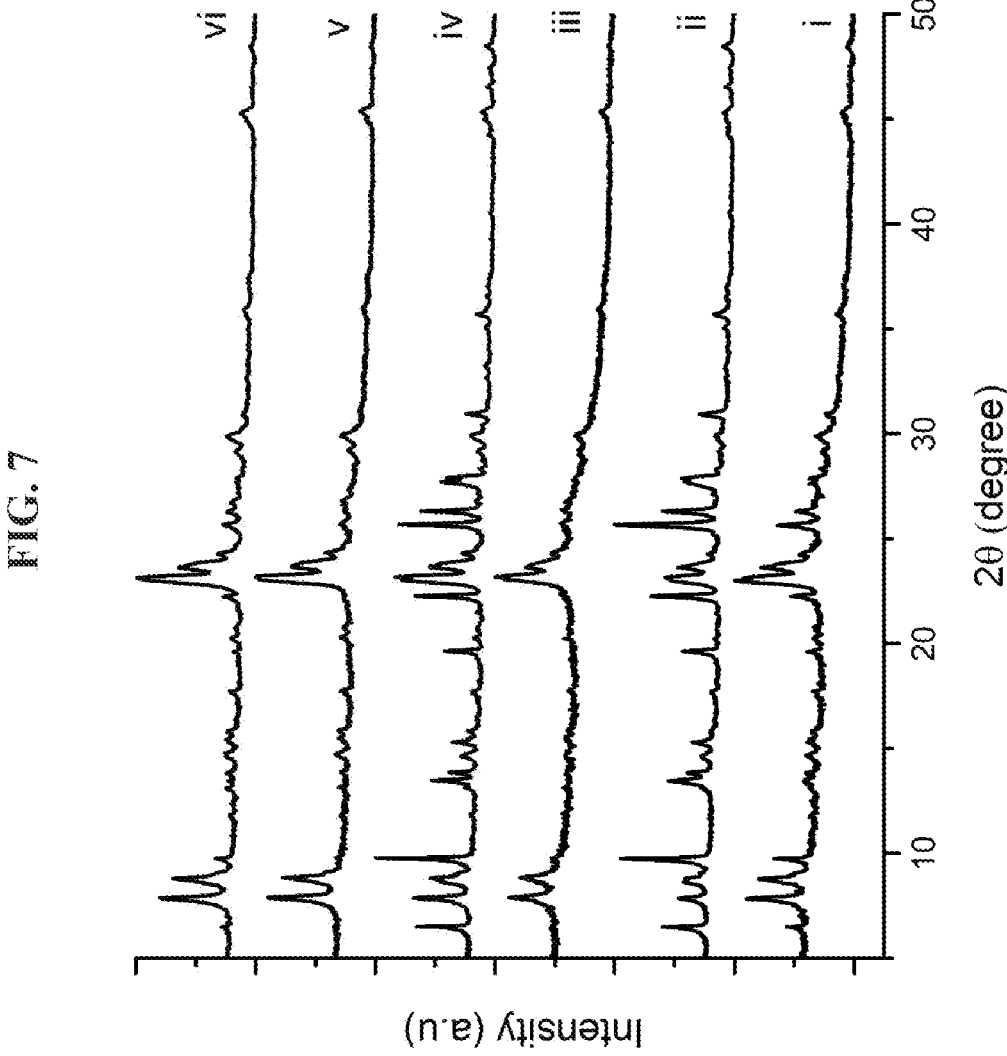
FIG. 7 shows powder XRD patterns for exemplary interconnected zeolite nanosheets extracted from syntheses using silicalite-2 seeds and organic-free growth media with molar compositions of (i-iii) 3.42 $Na_2O$: 18 $SiO_2$: 1 $Al_2O_3$:X $H_2O$ and (iv-vi) 3.42 $Na_2O$: 24.62 $SiO_2$: 1.37 $Al_2O_3$:X $H_2O$, where: (i) X=224, (ii) X=424, (iii) X=600, (iv) X=224, (v) X=324, and (vi) X=443.

FIG. 7 shows powder XRD patterns for the interconnected zeolite nanosheets extracted from the different syntheses described above using silicalite-2 seeds and molar compositions (i-iii) 3.42 $Na_2O$: 18 $SiO_2$: 1 $Al_2O_3$:X $H_2O$ and (iv-vi) 3.42 $Na_2O$: 24.62 $SiO_2$: 1.37 $Al_2O_3$:X $H_2O$ at different water contents: (i) X=224, (ii) X=424, (iii) X=600, (iv) X=224, (v) X=324, and (vi) X=443.

Optional post synthesis treatment. It was observed that the performance of interconnect nanosheet products was improved with facile post-synthesis treatment. The as-synthesized samples were washed with 0.1 M HCl (3 weight percent suspension) at room temperature for 5 h. This mild acid treatment was used to remove the remnants of any amorphous material. As-synthesized samples were converted to proton form by ion exchange wherein the calcined zeolite was mixed with a 1.0 M $NH_4NO_3$ solution to obtain a 2 weight percent suspension. This mixture was heated to 80° C. for 2 h and the process repeated three times with centrifugation/washing between each ion exchange cycle. The final $NH_4$-zeolite samples were calcined once again with the same conditions stated above to generate H-form zeolites.

What is claimed is:

1. A method for synthesizing zeolite interconnected nanosheets, comprising:

placing calcined zeolite seed crystals in an organic-free growth medium to form a growth solution, wherein the calcined zeolite seed crystals are MEL or MFI type zeolite seed crystals, wherein the organic-free growth medium consists essentially of silica and aluminum in sodium hydroxide, wherein the organic-free growth medium is free of organic structure directing agents, wherein the organic-free growth medium is free of branching templates, and wherein the organic-free growth medium has a ratio of molar compositions of A $Na_2O$: B $SiO_2$: C $Al_2O_3$: X $H_2O$, wherein A is 3.4 to 3.5, wherein B is 18 to 25, wherein C is 1 to 1.4, and wherein X is 220 to 600;

allowing the calcined zeolite seed crystals to form zeolite interconnected nanosheets in the growth solution, wherein the zeolite interconnected nanosheets have a hierarchical, pillared morphology and a silicalite-2, ZSM-11, silicalite-1, or ZSM-5 framework; and isolating the zeolite interconnected nanosheets from the growth solution.

2. The method of claim 1, wherein A is 3.42, B is 18, C is 1, and X is 224, 324, 424, or 600.

3. The method of claim 1, wherein A is 3.42, B is 24.62, C is 1.37, and X is 224, 324, or 443.

4. The method of claim 1, wherein the zeolite interconnected nanosheets have a thickness of 30 nm.

* * * * *